United States Patent
Grablowitz et al.

(10) Patent No.: US 10,087,294 B2
(45) Date of Patent: Oct. 2, 2018

(54) AQUEOUS POLYURETHANEUREA DISPERSION CONTAINING FREE ACID GROUPS

(71) Applicant: Covestro Deutschland AG, Leverkusen (DE)

(72) Inventors: Hans G. Grablowitz, Köln (DE); Thomas Feller, Solingen (DE); Martin Kreuter, Leverkusen (DE); Petra Janßen, Kerken (DE); Ingo Gipperich, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 279 days.

(21) Appl. No.: 15/058,642

(22) Filed: Mar. 2, 2016

(65) Prior Publication Data
US 2016/0257795 A1    Sep. 8, 2016

(30) Foreign Application Priority Data

Mar. 6, 2015 (EP) ..................... 15157971

(51) Int. Cl.
| | | |
|---|---|---|
| *C08J 5/08* | (2006.01) | |
| *C08G 18/08* | (2006.01) | |
| *C08G 18/34* | (2006.01) | |
| *C09D 175/12* | (2006.01) | |
| *C08G 18/72* | (2006.01) | |
| *C08G 18/73* | (2006.01) | |
| *C08G 18/75* | (2006.01) | |
| *C08G 18/12* | (2006.01) | |
| *D06M 15/568* | (2006.01) | |
| *C03C 25/326* | (2018.01) | |

(52) U.S. Cl.
CPC ............. *C08J 5/08* (2013.01); *C03C 25/326* (2013.01); *C08G 18/0823* (2013.01); *C08G 18/12* (2013.01); *C08G 18/348* (2013.01); *C08G 18/722* (2013.01); *C08G 18/73* (2013.01); *C08G 18/755* (2013.01); *C09D 175/12* (2013.01); *D06M 15/568* (2013.01); *C08J 2331/02* (2013.01); *C08J 2333/04* (2013.01); *C08J 2363/00* (2013.01); *C08J 2375/04* (2013.01); *C08J 2475/12* (2013.01)

(58) Field of Classification Search
CPC ..................... C08G 18/0823; C08G 18/348
See application file for complete search history.

(56) References Cited

U.S. PATENT DOCUMENTS

| | | | |
|---|---|---|---|
| 4,098,933 A | 7/1978 | Burkhardt et al. | |
| 4,284,544 A | 8/1981 | Wegner et al. | |
| 7,276,554 B2 * | 10/2007 | Rische ............... | C08G 18/0819 427/372.2 |
| 8,048,954 B2 | 11/2011 | Grablowitz et al. | |
| 8,685,704 B2 | 4/2014 | Lang et al. | |
| 2011/0300595 A1 | 12/2011 | Lang et al. | |
| 2014/0249266 A1 | 9/2014 | Grablowitz et al. | |

FOREIGN PATENT DOCUMENTS

| | | |
|---|---|---|
| DE | 2 456 469 A1 | 8/1976 |
| DE | 2 853 937 A1 | 7/1980 |
| DE | 19914885 A1 | 10/2000 |
| DE | 102007019184 A1 | 10/2008 |
| DE | 102008051727 A1 | 4/2010 |
| EP | 0 293 647 A2 | 12/1988 |
| EP | 0 741 979 A2 | 11/1996 |
| EP | 2 209 828 A1 | 7/2010 |
| WO | WO-2009062603 A1 | 5/2009 |

OTHER PUBLICATIONS

Machine translation of DE 199 14 885 A1, Oct. 5, 2000.*

* cited by examiner

*Primary Examiner* — Vickey Nerangis
(74) *Attorney, Agent, or Firm* — Drinker Biddle & Reath LLP

(57) ABSTRACT

The present invention relates to an aqueous polyurethaneurea dispersion, wherein the polyurethaneurea has specific formation components, and which is characterized in that it has a content of —COOH groups of at least 0.75% by weight, where 0% to 35% of these groups have been neutralized, and in that 5 to 50 mol % of isocyanate groups present have been reacted with a monofunctional component. The invention further relates to the use of this dispersion as coating composition, to a fiber having a cured coating and to a composite material.

10 Claims, No Drawings

AQUEOUS POLYURETHANEUREA DISPERSION CONTAINING FREE ACID GROUPS

CROSS-REFERENCE TO RELATED APPLICATIONS

This application claims priority to European Application No. 15157971.1, filed Mar. 6, 2015, which is incorporated herein by reference in its entirety.

The present invention relates to aqueous polyurethaneurea dispersions having specific formation components, to the production processes therefor, to the use thereof as coating composition on fibres and to the use of the coated fibres in a composite material.

BACKGROUND OF THE INVENTION

Coating compositions based on polyurethaneureas play a major role because of their excellent properties, for example high scratch resistance and cold flexibility. Because of rising environmental and other legal requirements, the solvent-free aqueous polyurethaneureas are of particular importance. Coatings based on polyurethaneurea dispersions are used in different applications, for example textile coating, painting of plastics and automobiles, and in the electronics sector.

The use of polyurethaneurea dispersions for production of glass fibre sizes is also known, for example, from DE 199 14 885 A1 or EP 2 209 828 A1. Such sizes essentially serve to prevent abrasion between glass fibres during the process of their manufacture. In addition, size-coated glass fibres also have improved strength and improved flow capacity. Thus, demands are made on the polyurethaneurea present in the dispersions in relation to good adhesion and interaction with the glass fibre.

If such glass fibres are used to reinforce plastics (fibre-reinforced composite materials), the size must additionally also assure good compatibility with the plastic (matrix plastic), in order to function as a mediating layer between the glass fibre and the matrix material. Good attachment both to the matrix material and the glass fibre leads to good mechanical properties in the sense of reinforcement of the matrix material (for example increasing the transverse tensile strength or compressive shear strength).

Many such matrix materials are based on epoxy resins. Therefore, more particularly, there are also known size formations based on aqueous epoxy resins, since it is assumed that these can ensure good compatibility between size and matrix material (see, for example, EP 0 293 647 A or EP 0 741 979 A). However, the use of epoxy resins for coating of fibres is not possible for all applications for health reasons, and it is not impossible that the fibres coated with epoxy resins are not storage-stable because of the high reactivity of the epoxy group. Therefore, there is a fundamental interest in alternative size formulations.

DE 199 14 885 A1 describes polyurethaneurea dispersions which have dimethylpyrazole-blocked isocyanate groups and can be used as size for glass fibres. Disadvantages of blocked aqueous polyurethaneurea dispersions are the fact that partial deblocking takes place in the course of the typically forced drying of the fibres, and that the blocking agent is generally in free form after the elimination, which can lead to deterioration (e.g. discolouration) in properties of the fibres.

EP 2 209 828 A1 discloses size compositions based on aqueous polyurethaneurea dispersions having specific formation components. However, optimization of the reinforcing properties is fundamentally desirable.

BRIEF SUMMARY OF THE INVENTION

Proceeding from this prior art, the problem addressed by the present invention was that of providing an aqueous polyurethaneurea dispersion which remedies at least one and preferably all of the abovementioned disadvantages of the prior art. More particularly, the problem addressed by the present invention was that of providing an aqueous polyurethaneurea dispersion which, as a size formulation, provides good compatibility, preferably better compatibility, of fibres and matrix material. This shall especially provide a size formulation by which composite materials having good, preferably better, mechanical properties, for example good transverse tensile strengths, are obtained. More particularly, this shall not alter the intrinsic properties of the fibres, for example their colour.

These problems were solved by the provision of the aqueous polyurethaneurea dispersion of the invention, the use thereof, the fibres of the invention and the production process therefor, and the composite material of the invention, as described in detail hereinafter.

DETAILED DESCRIPTION OF THE INVENTION

Dispersion

The present invention provides an aqueous polyurethaneurea dispersion, the polyurethaneurea comprising at least the following components as formation components:
A) at least one polyisocyanate compound having a functionality of ≤2,
B) at least one polyol,
C) at least one formation component which differs from components B), D) and, if present, component E) and which has at least one group reactive toward isocyanate groups and at least one —COOH group, and
D) at least one nonionic hydrophilizing agent having at least one group reactive toward isocyanate groups, and
E) optionally at least one monofunctional compound reactive toward isocyanate groups which is different from C) and D) and does not have any unsaturated groups or epoxy groups,
characterized in that
the polyurethaneurea has a content of —COOH groups of 0.75% to 7.50% by weight in relation to the total weight of the polyurethaneurea in the dried state and 0% to 35% of these —COOH groups have been neutralized, and
in that 5 to 50 mol % of the isocyanate groups of component A) have been reacted with a monofunctional component, said monofunctional component being selected from the group consisting of one of components C), D), E) and the sum total of any desired mixture of components C), D) and E), provided that, when neither component C) nor component D) is monofunctional, component E) is necessarily present as formation component.

In the context of the present invention, the term "polyurethaneurea" is used exclusively. The person skilled in the art is aware that a polyurethane has additional urea groups when at least one of the formation components is an amine. According to the invention, depending on the formation components used, the term thus includes both polyurethanes and polyurethaneureas.

Preferably, the references to "comprising", "containing", etc. mean "consisting essentially of" and most preferably "consisting of".

According to the invention, the aqueous polyurethaneurea dispersion comprises a polyurethaneurea having at least one of components A), B), C), D) and optionally E) as formation components. In this context, components A) to E) each differ from one another, if neither component C) nor D) is a monofunctional compound reactive toward isocyanate groups, component E) is necessarily present as formation component. This means that the polyurethaneurea in the polyurethaneurea dispersion of the invention always includes at least one monofunctional compound as formation component, so as to give rise to the level of chain termination defined in accordance with the invention of 5 to 50 mol %. In this connection, "monofunctional" means that the component has just one functional group reactive toward isocyanate groups. This monofunctional component, which causes the level of chain termination, may also be selected from the group of components C) and D), C) and E), D) and E), and C), D) and E). In this regard, isolated references are made hereinafter, merely for simplification, to the "monofunctional component", but each of the abovementioned configurations is encompassed.

The polyurethaneurea in the dispersion of the invention has a content of —COOH groups of 0.75% to 7.50% by weight in relation to the total weight of the polyurethaneurea in the dried state. Preferably, the polyurethaneurea has a content of —COOH groups of 1.00% to 5.00% by weight, more preferably 1.25% to 3.00% by weight, in relation to the total weight of the polyurethaneurea in the dried state.

The determination of the content of —COOH groups in the polyurethaneurea is known to those skilled in the art. Preferably, the person skilled in the art will select formation component C) so as to give quantitative conversion of component C) in the polyurethaneurea (theoretical percentages by weight of the —COOH groups in component C) used, depending on the amount of component C) used, correspond to the resulting percentages by weight of the —COOH groups in the polyurethaneurea). It is likewise possible for the person skilled in the art to determine the percentages by weight of the —COOH groups in the polyurethaneurea subsequently as well. This can preferably be effected via titration or by means of $^1$H NMR measurements in a manner known to those skilled in the art.

According to the invention, 0% to 35% of these —COOH groups have been neutralized. Thus, the invention involves a polyurethaneurea dispersion comprising a polyurethaneurea having essentially no ionic modification. In the context of the present invention, this is understood to mean that the polyurethaneureas for use in accordance with the invention contain essentially no neutralized carboxyl groups, with at most 0% to 35%, more preferably 0% to 10% and most preferably 0% to 2% of the acid groups having been neutralized. Thus, the polyurethaneurea is preferably nonionic, meaning that it does not include any formation component containing an ionic group. Such ionic groups may, as well as the carboxyl groups mentioned, especially also be sulphonate, carboxylate, phosphate and phosphonate groups.

It has been found that stable size formulations can be produced from the polyurethaneurea dispersions of the invention. These normally contain cationic additions, and so it is advantageous to neutralize the —COOH groups to a minimum degree. At the same time, it has been found that, by means of the neutralization level defined in accordance with the invention, particularly stable composite materials are obtainable.

0% to 35%, preferably 0% to 25%, more preferably 0% to 10%, even more preferably 0% to 5%, especially preferably 0% to 2.5% and most preferably 0% of the —COOH groups of the polyurethaneurea have been neutralized. The neutralization level is defined as the ratio of the —COOH groups to the —COOH groups that have been neutralized with a base. Thus, the polyurethaneurea of the invention has free acid groups. Therefore, the polyurethane dispersion of the invention preferably has a pH at 25° C. of less than 7, more preferably less than 6 and especially preferably 3 to 5.8.

According to the invention, 5 to 50 mol % of the isocyanate groups of component A) have been reacted with a monofunctional component, said monofunctional component being selected from the group consisting of one of components C), D), E) and the sum total of any desired mixture of components C), D) and E), provided that, when neither component C) nor component D) is monofunctional, component E) is necessarily present as formation component. Thus, 5 to 50 mol % of isocyanate groups used in component A) are terminated by means of a chain terminator, i.e. a compound having just one function reactive toward isocyanate groups.

The specified level of chain termination describes the percentage molar ratio of all compounds which react in a monofunctional manner toward the isocyanate groups under the given reaction conditions and are selected from the group consisting of components C), D), E) and any desired mixtures of these components, as described above, with the isocyanate groups of component A).

Preferably 20 to 48 mol %, more preferably 22 to 45 mol % and even more preferably 25 to 40 mol % of the isocyanate groups of component A) have been reacted with the specific monofunctional component. It has been found that the effect of the proportion of chains terminated by means of monofunctional compounds in the polyurethaneurea of the present invention being within this defined range is that the molar mass of the polyurethaneurea is kept low, such that the viscosity of the polyurethaneurea dispersion is optimal for use in coating systems. More particularly, it has been found that the molar mass and hence the solubility and melt viscosity of the resulting polyurethaneureas, by virtue of this level of chain termination, is optimal for use in or as size formulation, especially for glass fibre sizes.

In a preferred embodiment of the present invention, the polyurethaneurea in the polyurethaneurea dispersion of the invention has a content of —COOH groups of 0.75%-7.50% by weight in relation to the total weight of the polyurethaneurea in the dried state, where 0% to 10% of the —COOH groups of the polyurethaneurea have been neutralized and 20 to 48 mol % of the isocyanate groups of component A) have been reacted with at least one of the monofunctional components defined. In this embodiment, it is further preferable that 0% to 2%, more preferably 0%, of the —COOH groups have been neutralized.

In a further preferred embodiment of the present invention, the polyurethaneurea in the polyurethaneurea dispersion of the invention has a content of —COOH groups of 0.75%-7.50% by weight in relation to the total weight of the polyurethaneurea in the dried state, where 0% to 10% of the —COOH groups of the polyurethaneurea have been neutralized and 22 to 45 mol % of the isocyanate groups of component A) have been reacted with at least one of the monofunctional components defined. In this embodiment, it is further preferable that 0% to 2%, more preferably 0%, of the —COOH groups have been neutralized.

In a further preferred embodiment of the present invention, the polyurethaneurea in the polyurethaneurea dispersion of the invention has a content of —COOH groups of 0.75%-7.50% by weight in relation to the total weight of the polyurethaneurea in the dried state, where 0% to 10% of the —COOH groups of the polyurethaneurea have been neutralized and 25 to 40 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.00%-5.00% by weight in relation to the total weight of the polyurethaneurea in the dried state, where 0% to 10% of the —COOH groups of the polyurethaneurea have been neutralized and 20 to 48 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.00%-5.00% by weight in relation to the total weight of the polyurethaneurea in the dried state, where 0% to 10% of the —COOH groups of the polyurethaneurea have been neutralized and 22 to 45 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.00%-5.00% by weight in relation to the total weight of the polyurethaneurea in the dried state, where 0% to 10% of the —COOH groups of the polyurethaneurea have been neutralized and 25 to 40 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.25%-3.00% by weight in relation to the total weight of the polyurethaneurea in the dried state, where 0% to 10% of the —COOH groups of the polyurethaneurea have been neutralized and 20 to 48 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.25%-3.00% by weight in relation to the total weight of the polyurethaneurea in the dried state, where 0% to 10% of the —COOH groups of the polyurethaneurea have been neutralized and 22 to 45 mol % of the isocyanate groups of component A) have been reacted with at least one of the monofunctional components defined. In this embodiment, it is further preferable that 0% to 2%, more preferably 0%, of the —COOH groups have been neutralized.

In a likewise preferred embodiment of the present invention, the polyurethaneurea in the polyurethaneurea dispersion of the invention has a content of —COOH groups of 1.25%-3.00% by weight in relation to the total weight of the polyurethaneurea in the dried state, where 0% to 10% of the —COOH groups of the polyurethaneurea have been neutralized and 25 to 40 mol % of the isocyanate groups of component A) have been reacted with at least one of the monofunctional components defined. In this embodiment, it is further preferable that 0% to 2%, more preferably 0%, of the —COOH groups have been neutralized.

It has been found that the specific combination of the content of —COOH groups, the neutralization level thereof and the level of chain termination gives polyurethaneurea dispersions which firstly have good compatibility, for example by virtue of their melt viscosity and solubility in the matrix material to be processed, and suitability as or in size formulation. Secondly, this specific combination of properties also leads to good compatibility of the size with the fibre, especially glass fibre, and simultaneously also with the matrix material. Therefore, it is possible in accordance with the invention to obtain a composite material having excellent mechanical properties. More preferably, the abovementioned specific combination of the content of —COOH groups, the neutralization level thereof and the chain termination level can give a composite material having super-additive mechanical properties in relation to the individual formation components of the polyurethaneurea, especially in relation to transverse tensile strength (synergistic effect). This means that the resulting transverse tensile strength of the composite material is better overall than would have been expected on the basis of the individual features of the content of —COOH groups, the neutralization level and the chain termination level.

Suitable polyisocyanates of component A) are the aromatic, araliphatic, aliphatic or cycloaliphatic polyisocyanates having a functionality of ≤2 that are known per se to those skilled in the art. Suitable polyisocyanates are, for example, butylene 1,4-diisocyanate, hexamethylene 1,6-diisocyanate (HDI), isophorone diisocyanate (IPDI), pentamethylene 1,5-diisocyanate, 2,2,4- and/or 2,4,4-trimethylhexamethylene diisocyanate, the isomeric bis(4,4'-isocyanatocyclohexyl)methanes or mixtures thereof having any desired isomer content, cyclohexylene 1,4-diisocyanate, phenylene 1,4-diisocyanate, tolylene 2,4- and/or 2,6-diisocyanate, naphthylene 1,5-diisocyanate, diphenylmethane 2,4'- and/or 4,4'-diisocyanate, 1,3- and 1,4-bis(2-isocyanatoprop-2-yl)benzene (TMXDI), 1,3-bis(isocyanatomethyl) benzene (XDI), (S)-alkyl 2,6-diisocyanatohexanoates or (L)-alkyl 2,6-diisocyanatohexanoates.

Preferably, component A) comprises polyisocyanates or polyisocyanate mixtures of the aforementioned type having exclusively aliphatically and/or cycloaliphatically bound isocyanate groups having a mean functionality of 1 to 2, preferably 2.

Particular preference is given to isophorone diisocyanate, hexamethylene 1,6-diisocyanate (HDI) and mixtures thereof.

Polyols usable as component B) preferably have a number-average molecular weight $M_n$ of 400 g/mol to 8000 g/mol, preferably of 400 g/mol to 6000 g/mol and more preferably of 400 g/mol to 3000 g/mol. The hydroxyl number thereof is preferably 22 to 400 mg KOH/g, preferably 30 to 300 mg KOH/g and more preferably 40 to 250 mg KOH/g. They preferably have an OH functionality of 1.5 to 6, preferably of 1.8 to 3 and more preferably of 1.9 to 2.1. Unless stated otherwise, the molecular weights specified are measured by means of gel permeation chromatography against a universal calibration.

Polyols in the context of the present invention are the organic polyhydroxyl compounds known in polyurethane coating technology, for example the standard polyester polyols, polyacrylate polyols, polyurethane polyols, polycarbonate polyols, polyether polyols, polyether carbonate polyols, polyester polyacrylate polyols and polyurethane polyacrylate polyols, polyurethane polyester polyols, polyurethane polyether polyols, polyurethane polycarbonate polyols, polyester polycarbonate polyols, phenol/formaldehyde resins, alone or in mixtures. Preference is given to polyester polyols, polyether polyols or polycarbonate polyols, particular preference to polyester polyols. More preferably in accordance with the invention, component B) is characterized in that it is at least one aliphatic polyester polyol. It has been found that the suitability of the polyurethaneurea dispersion in or as size formulation is particularly good in this case, since it is possible to achieve both good compatibility with the fibre, especially glass fibre, and with the matrix material.

Polyether polyols include, for example, the polyaddition products of the styrene oxides, of ethylene oxide, propylene oxide, tetrahydrofuran, butylene oxide, epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols.

Suitable hydroxy-functional polyethers B) preferably have OH functionalities of 1.8 to 6.0, preferably 2.0 to 4.0, OH numbers of 50 to 700 and preferably of 100 to 600 mg KOH/g of solids, and molecular weights $M_n$ of 106 to 4000 g/mol, preferably of 200 to 3500, for example alkoxylation products of hydroxy-functional starter molecules such as ethylene glycol, propylene glycol, butanediol, hexanediol, trimethylolpropane, glycerol, pentaerythritol, sorbitol or mixtures of these and also other hydroxy-functional compounds with propylene oxide or butylene oxide. Preferred polyether components B) are polypropylene oxide polyols having a molecular weight of 300 to 4000 g/mol. In this context, the polyether polyols of particularly low molecular weight, given correspondingly high OH contents, may be water-soluble. Particular preference is given, however, to water-insoluble polypropylene oxide polyols and polytetramethylene oxide polyols, and mixtures thereof.

Examples of polyester polyols that are of good suitability are the polycondensates, known per se, of di- and optionally tri- and tetraols and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols to prepare the polyesters. Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol, preference being given to the three latter compounds. Examples of polyols for optional additional use include trimethylolpropane, glycerol, erythritol, pentaerythritol, trimethylolbenzene or trishydroxyethyl isocyanurate.

Useful dicarboxylic acids include, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid and succinic acid. Anhydrides of these acids are likewise usable, where they exist. For the purposes of the present invention, the anhydrides are consequently covered by the expression "acid". It is also possible to use monocarboxylic acids such as benzoic acid and hexanecarboxylic acid, provided that the mean functionality of the polyol is ≥2. Saturated aliphatic or aromatic acids are preferred, such as adipic acid or isophthalic acid. One example of a polycarboxylic acid for optional additional use in smaller amounts is trimellitic acid.

In addition, suitable polyester polyols are also those obtainable by the polymerization of renewable raw materials. Reference may be made here by way of example to the use of succinic acid which is obtained by a fermentation process as described, for example, in DE 10 2008 051727 A1 or DE 10 2007 019184 A1.

Examples of hydroxycarboxylic acids that may be used as co-reactants in the production of a polyester polyol having terminal hydroxyl groups include hydroxycaproic acid, hydroxybutyric acid, hydroxydecanoic acid, hydroxystearic acid and the like. Usable lactones include caprolactone, butyrolactone and homologues.

Preference is given to polyester polyols B) based on butanediol and/or neopentyl glycol and/or hexanediol and/or ethylene glycol and/or diethylene glycol with adipic acid and/or phthalic acid and/or isophthalic acid. Particular preference is given to polyester polyols B) based on butanediol and/or neopentyl glycol and/or hexanediol with adipic acid and/or isophthalic acid.

The useful polycarbonate polyols are obtainable by reaction of carbonic acid derivatives, for example diphenyl carbonate, dimethyl carbonate or phosgene, with diols. Useful diols of this kind include, for example, ethylene glycol, propane-1,2- and 1,3-diol, butane-1,3- and 1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% to 100% by weight of hexane-1,6-diol and/or hexanediol derivatives, preferably those having not only terminal OH groups but also ether or ester groups, for example products which are obtained by reaction of 1 mol of hexanediol with at least 1 mol, preferably 1 to 2 mol, of ε-caprolactone, or by etherification of hexanediol with itself to give di- or trihexylene glycol. It is also possible to use polyether polycarbonate polyols.

Preference is given to polycarbonate polyols B) based on dimethyl carbonate and hexanediol and/or butanediol and/or caprolactone. Very particular preference is given to polycarbonate polyols B) based on dimethyl carbonate and hexanediol and/or caprolactone.

Component C) is a formation component which differs from components B), D) and, if present, component E) and which has at least one group reactive toward isocyanate groups and at least one —COOH group. Preferably, component C) is selected from the group consisting of monohydroxycarboxylic acids, dihydroxycarboxylic acids, trihydroxycarboxylic acids, dihydroxydicarboxylic acids, monoaminocarboxylic acids, diaminocarboxylic acids, triaminocarboxylic acids and any desired mixtures thereof.

Most preferably, component C) is one or more compounds selected from the group consisting of dimethylolpropionic acid, dimethylolbutyric acid, dimethylolacetic acid, dihydroxysuccinic acid, hydroxypivalic acid, hydroxyacetic acid, hydroxypropionic acid, 6-aminohexanoic acid, alanine, N-(2-aminoethyl)-β-alanine, aminoundecanoic acid, 8-aminooctanoic acid, 5-aminopentanoic acid, 4-aminobutyric acid, aminobenzoic acid, 4-aminomethylcyclohexanecarboxylic acid, 2-aminohexanoic acid, 4-aminocyclohexanecarboxylic acid, 12-aminododecanoic acid and 9-aminononanecarboxylic acid.

Component D) is at least one nonionic hydrophilizing agent having at least one group reactive toward isocyanate groups. In this context, the term "nonionic" preferably has the meanings already given above. This component serves for dispersibility of the polyurethaneurea in water. Preferably, component D) is a monofunctional polyethylene glycol-containing component wherein the proportion of polyethylene glycol is at least 50% by weight and which has a molar mass Mn 1200 g/mol to 3000 g/mol. As already described above, in this case where component D) is a monofunctional compound, the reaction thereof with an isocyanate group is counted as part of the chain termination.

Suitable nonionically hydrophilizing monofunctional compounds corresponding to the definition of component D) are, for example, polyoxyalkylene ethers containing just one hydroxyl or amino group. These polyethers contain a proportion of 50% by weight to 100% by weight of units derived from ethylene oxide, preferably 70% by weight to 100% by weight and more preferably 80% by weight to 100% by weight, as obtainable in a manner known per se by alkoxylating the starter molecules mentioned under B). Alkylene oxides suitable for the alkoxylation reaction are especially ethylene oxide and propylene oxide, which can be used in the alkoxylation reaction in any sequence or else in a mixture.

The molar mass $M_n$ of these units is 300 g/mol to 6000 g/mol, preferably 1500 g/mol to 3000 g/mol, and more preferably 2000 g/mol to 3000 g/mol.

Suitable nonionically hydrophilizing monofunctional compounds are, for example, monofunctional alkoxy polyethylene glycols, for example methoxy polyethylene glycols (MPEG Carbowax® 2000 or methoxy PEG-40, molar mass range 1800 to 2200, The Dow Chemical Company), monofunctional polyether monoalkyl ethers, for example LB 25 foliated from butanol and ethylene oxide and propylene oxide, having a mean molar mass $M_n$ of 2250 g/mol from Bayer Material Science, and also those compounds having two reactive groups toward NCO groups (e.g. Ymer 120 N, Perstorp), monofunctional polyetheramines (Jeffamine® M 1000, molar PO/EO ratio 3/19 and M 2070, molar PO/EO ratio 10/31, Huntsman Corp).

Preference is given to using, as D), MPEG Carbowax® 2000, LB 25 or Jeffamine® M 2070. Particular preference is given to MPEG Carbowax® 2000 or LB 25.

The optional component E) is at least one monofunctional compound reactive toward isocyanate groups which is different from C) and D) and does not have any unsaturated groups or epoxy groups. In a preferred embodiment, component E) is an obligatorily present formation component of the polyurethaneurea. Preferably, the term "monofunctional" in relation to component E) is understood to mean a component which, under the given reaction conditions, has just one function reactive toward isocyanate groups.

Preferably, component E) is selected from the group consisting of monoamines, especially secondary monoamines, and monoalcohols. Examples include ethanol, n-butanol, ethylene glycol monobutyl ether, 2-ethylhexanol, 1-octanol, 1-dodecanol, 1-hexadecanol, methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine and suitable substituted derivatives thereof, amide amines formed from diprimary amines and monocarboxylic acids, monoketimines of diprimary amines, primary/tertiary amines such as N,N-dimethylaminopropylamine. In addition, it is also possible to use compounds which, as well as an amino group (primary or secondary), also have OH groups, but ones which do not react with the isocyanate groups under the given reaction conditions. Examples of these are secondary amines such as diethanolamine, ethanolamine, 2-(2-aminoethoxy)ethanol, 2-amino-2-methylpropane-1,3-diol.

Preferably, the compound is ethylene glycol monobutyl ether and/or diethanolamine.

When component E) has primary or secondary amino groups, component E) is preferably reacted with the NCO-functional prepolymer which is obtained by the reaction at least of components A), B), C) and D) in a manner known to those skilled in the art. When component E) contains exclusively OH groups, the reaction is preferably effected directly with the polyisocyanate A) in the preparation of the NCO-functional prepolymer.

As well as the above-described components A) to D) and optionally E), the polyurethaneurea of the dispersion of the invention may include further formation components that are standard in polyurethane chemistry.

Particular preference is given to additionally using a difunctional NCO-reactive compound for chain extension. This is preferably at least one polyamine. The polyamines used for chain extension are preferably di- or polyamines and dihydrazides, for example ethylenediamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 1,3- and 1,4-xylylenediamine, $\alpha,\alpha,\alpha',\alpha'$-tetramethyl-1,3- and -1,4-xylylenediamine and 4,4-diaminodicyclohexylmethane, dimethylethylenediamine, hydrazine, carbohydrazide or adipic dihydrazide. Preference is given to carbohydrazide and/or hydrazine and/or isophoronediamine (IPDA) and/or ethylenediamine. Particular preference is given to carbohydrazide and/or isophoronediamine and/or ethylenediamine. Very particular preference is given to a mixture of carbohydrazide and IPDA.

Preparation of the polyurethaneurea dispersions of the invention can be accomplished using all methods known from the prior art, for example prepolymer mixing methods, acetone methods or melt dispersion methods. Preferably, the polyurethaneurea dispersion is produced by the acetone method.

For the production of the polyurethaneurea dispersion by the acetone method, it is customary to wholly or partly initially charge constituents B), C), D) and optionally E), which must not have any primary or secondary amino groups, and the polyisocyanate component A) for preparation of an isocyanate-functional polyurethane prepolymer, and optionally to dilute them with a solvent which is water-miscible but inert toward isocyanate groups, and to heat them to temperatures in the range from 50 to 120° C. The isocyanate addition reaction can be accelerated using the catalysts known in polyurethane chemistry. Preference is given to organometallic compounds, for example dibutyltin dilaurate.

Suitable solvents are the customary aliphatic keto-functional solvents, for example acetone, butanone, which can be added not just at the start of the preparation but optionally also in portions at a later stage. Preference is given to acetone and butanone.

Subsequently, any constituents of A)-E) which have not yet been added at the start of the reaction are metered in.

In the preparation of the polyurethane prepolymer, the molar ratio of isocyanate groups to isocyanate-reactive groups is 1.0 to 3.5, preferably 1.1 to 3.0, more preferably 1.1 to 2.5.

The conversion of components A), B), C), D) and optionally E) to the prepolymer is effected in part or in full, but preferably in full. In this way, polyurethane prepolymers containing free isocyanate groups are obtained in substance or in solution.

Thereafter, in a further process step, if this has been done only partly, if at all, the prepolymer obtained is dissolved with the aid of aliphatic ketones such as acetone or butanone.

Subsequently, the optional component E) and/or any possible $NH_2$— and/or NH-functional components, preferably the above-described polyamines for chain extension, are reacted with the isocyanate groups still remaining. This chain extension/termination can be conducted either in solvent prior to the dispersion, during the dispersion, or in water after the dispersion. Preference is given to conducting the chain extension in a solvent prior to the dispersion in water. When water or organic solvents are used in addition as diluent, the concentration is preferably 30% to 80% by weight.

For production of the polyurethaneurea dispersion, the dissolved polyurethaneurea polymer, optionally under vigorous shear, for example vigorous stirring, is either introduced into the dispersion water or, conversely, the dispersion water is stirred into the prepolymer solutions. Preferably, the water is added to the dissolved prepolymer.

The solvent still present in the dispersions after the dispersion step is typically then removed by distillation. Removal even during the dispersion is likewise possible.

In a further embodiment, the dispersions of the invention can also be produced in urea group-free form when the optional component E) does not have any primary or secondary amino groups, but otherwise all the above-detailed features of the chain termination level and the acid content and the neutralization level are satisfied. In this case, the molar NCO/OH ratio is ≤1 and there is no chain extension step.

The solids content of the polyurethaneurea dispersion of the invention is preferably between 20% and 70% by weight, preferably 25% and 65% by weight and more preferably between 30% and 60% by weight.

According to the invention, the dispersion is aqueous. This preferably means that it essentially no longer contains any organic solvent. The residual content of organic solvent is preferably below 5% by weight, more preferably below 3% by weight and most preferably below 1% by weight of the total weight of the polyurethaneurea dispersion.

Preferably, the polyurethaneurea in the dispersion of the invention comprises 5% to 40% and more preferably 10% to 30% by weight of component A), 30% to 85% by weight and more preferably 40% to 80% by weight of component B), 1% to 12% by weight and more preferably 2% to 10% by weight of component C), 5% to 25% by weight and more preferably 8% to 20% by weight of component D) and, if present, 1% to 15% by weight and more preferably 4% to 12% by weight of component E), where the sum total of formation components A) to D) and optionally E) always adds up to 100% by weight (this does not mean that the polyurethaneurea cannot also comprise further additional formation components; the percentages by weight stated define only the ratios of the percentages by weight of A) to D) and optionally B) to one another).

The polyurethaneurea dispersion of the invention preferably has a viscosity at 23° C. of 10 to 750, more preferably 20 to 500 and most preferably of 30 to 450 mPas. The viscosity is preferably determined by means of a Haake viscometer at a shear rate of 45 $s^{-1}$.

The polyurethaneurea dispersion of the invention preferably has a median particle size of 50 to 700 nm, more preferably 60 to 600 nm and most preferably 70 to 500 nm. The median particle sizes (MTG) are preferably determined by means of static light scattering (Malvern Instruments, model: Zetasizer 1000). This is done using water as solvent and the measurement takes place at 25° C. The median particle sizes in each case are the D50 of the Z average.

Use

In a further aspect, the present invention relates to the use of the aqueous polyurethaneurea dispersion of the invention in all configurations and embodiments for production of coating compositions. It is particularly preferable that the coating composition is a glass fibre size.

Coating Composition

In a further aspect of the present invention, an aqueous coating composition is provided, containing at least one aqueous polyurethaneurea dispersion of the invention in all configurations and embodiments, and at least one of auxiliary and/or additive.

This coating composition of the invention may also contain a mixture of the polyurethaneurea dispersions of the invention.

Suitable auxiliaries or additives for formulation of fibre sizes are known to those skilled in the art. These are, for example, antioxidants, UV stabilizers, leveling agents, biocides, antistats, lubricants or adhesion promoters.

Adhesion promoters used may be the known silane adhesion promoters such as 3-aminopropyltrimethoxy- or -triethoxysilane, N-(2-aminoethyl)-3-aminopropyltrimethoxysilane, 3-glycidylpropyltrimethoxysilane, vinyltrimethoxysilane, vinyltriethoxysilane, 3-methacryloyloxypropyltriethoxysilane or mixtures of these compounds.

The adhesion promoter is preferably used in an amount of 0.01% to 1.50% by weight, more preferably 0.05% to 1.00% by weight and most preferably 0.1% to 0.75% by weight, based on the total weight of the coating composition.

In addition, the coating compositions of the invention may contain one or more nonionic and/or ionic lubricants, such as polyethylene glycol ethers of fatty alcohols or fatty amines, polyalkylene glycol ethers and glycerol esters of fatty acids having 12 to 18 carbon atoms, polyalkylene glycols, higher fatty acid amides having 12 to 18 carbon atoms of polyalkylene glycols and/or alkylenamines, quaternary nitrogen compounds, e.g. ethoxylated imidazolinium salts, mineral oils or waxes. These lubricants reduce interfilament abrasion between fibres.

The lubricant is preferably used in an amount of 0.01% to 1.50% by weight, more preferably 0.05% to 1.00% by weight and most preferably 0.1% to 0.75% by weight, based on the total weight of the coating composition.

The coating compositions of the invention may also contain one or more antistats. Examples include lithium chloride, ammonium chloride, Cr(III) salts, organic titanium compounds, alkylarylsulphates or sulphonates, aryl polyether glycol sulphonates or quaternary nitrogen compounds.

The fibre sizes of the invention may, as well as the dispersions of the invention, also contain further, different aqueous film formers, for example epoxy emulsions, polyacrylate dispersions, vinyl acetate dispersions, polyester emulsions, polypropylene dispersions, urethane acrylates, epoxy acrylates and high molecular weight polyurethaneurea dispersions.

The present invention likewise provides aqueous coating compositions comprising the polyurethanepolyurea dispersion of the invention and a crosslinker selected from the group of the water-dispersible or water-soluble blocked polyisocyanates.

Crosslinkers used are blocked polyisocyanates which are optionally in water-dispersible or water-soluble form, or are used in the form of an aqueous dispersion or solution. The blocked polyisocyanates have a (mean) NCO functionality of 2.0 to 5.0, preferably of 2.3 to 4.5, a content of isocyanate groups (unblocked and blocked) of 5.0% to 27.0% by weight, preferably 14.0% to 24.0% by weight, and a content of monomeric diisocyanates of less than 1% by weight, preferably less than 0.5% by weight. The isocyanate groups of the polyisocyanates of the water-dispersible or water-soluble blocked polyisocyanates are in blocked form to an extent of at least 50%, preferably to an extent of at least 60% and more preferably to an extent of at least 70%. The water-dispersible blocked polyisocyanates II) can be prepared by known prior art methods (for example in DE-A 2 456 469, columns 7-8, Examples 1-5, and DE-A 2 853 937 p. 21-26, Examples 1-9).

The coating compositions of the invention preferably have a total amount of nonaqueous constituents of 1% to 10%, preferably 2% to 8% and more preferably 3% to 5% by weight in relation to the total weight of the coating composition.

The coating composition of the invention can be produced by the methods known per se. Preferably, a suitable mixing vessel is initially charged with water, and a binder, the hardener and subsequently the lubricant and any further auxiliaries are added while stirring. Thereafter, the pH is adjusted to 5-7 and a hydrolysate of an adhesion promoter is added. After a further stirring time of 15 minutes, the coating composition is ready to use and can be applied, optionally after adjusting the pH.

The coating compositions, preferably used as size compositions, can be applied to a suitable substrate and cured via any desired methods, for example by means of spray or roll applicators.

Suitable substrates are, for example, plastics, metals and glass.

Fibres

In a further aspect of the present invention, a fibre having the cured coating composition of the invention in all configurations and embodiments at least on part of its surface is provided. It is preferable here that the entire surface of the fibre is coated with the cured coating composition of the invention.

The fibre is preferably selected from the group consisting of glass fibres, carbon fibres, basalt fibres, synthetic fibres and any desired mixtures of these fibres. Particular preference is given to glass fibres. Suitable glass types for the sized glass fibres are both those known for glass fibre fabrication, such as E, A, C and S glass to DIN 1259-1 and the other products known per se from the glass manufacturers. Among the glass types mentioned for the production of continuous glass fibres, the E glass fibres are of the greatest significance for the reinforcement of plastics because of their freedom from alkali, high tensile strength and high modulus of elasticity.

In a further aspect of the present invention, a process for producing the fibres of the invention is provided, comprising the steps of:
(i) providing at least one fibre;
(ii) applying the aqueous coating composition of the invention in all configurations and embodiments to at least a portion of a surface of the at least one fibre from (i), giving rise to an at least partly coated fibre, and
(iii) curing the coating of the at least partly coated fibre from (ii).

The process for production, the process of sizing and the reprocessing of the glass fibres is known and described, for example, in K. L. Loewenstein "The Manufacturing Technology of Continuous Glass Fibres", Elsevier Scientific Publishing Corp., Amsterdam, London, New York, 1983.

The curing of step (iii) is preferably understood to mean a drying step. The curing of the coating composition of the invention is preferably effected by heating the coated fibres to a temperature within a range from 50 to 180° C., more preferably 70 to 160° C. and very particularly 80 to 150° C.

The fibres (monofilaments) to which the coating composition of the invention has been applied can be joined to form a strand of a multitude of fibres (multifilament). The strand may be wound on a winding form disposed in a rotating collet chuck. The winding form can be removed from the collet chuck and dried in an oven at a temperature of about 50° C. to about 150° C. for about 10 to 13 hours, producing glass fibre strands having a dried residue of the coating composition thereon. The drying temperature will depend on such variables as the percentage of solids in the coating composition, the constituents of the coating composition and the type of glass fibres. The coating composition preferably provides glass fibre strands having about 0.3 to 2.0 percent by weight of the dried coating composition on the strand, based on the total weight of the glass and the dried coating composition.

The strands may be transferred from the winding form and combined with a multitude of other strands, forming a roving. The roving can be used in the form of continuous strands, woven glass fibre mats or staple glass fibre, in order to reinforce a heat-curable polymer by means of a known method, for example by pultrusion methods for reinforced plastics.

Composite Material

In a further aspect of the present invention, a composite material comprising at least one fibre of the invention in all configurations and embodiments and a matrix material is provided.

This composite material is preferably characterized in that the at least one fibre is selected from the group consisting of glass fibres, carbon fibres, basalt fibres, synthetic fibres and any desired mixtures of these fibres. Particular preference is given to glass fibres. Suitable glass types for the sized glass fibres are both those known for glass fibre fabrication, such as E, A, C and S glass to DIN 1259-1 and the other products known per se from the glass manufacturers. Among the glass types mentioned for the production of continuous glass fibres, the E glass fibres are of the greatest significance for the reinforcement of plastics because of their freedom from alkali, high tensile strength and high modulus of elasticity.

Preferably, the matrix material is selected from the group consisting of a polyepoxide, an unsaturated polyester, a polyurethane, a polyvinyl ester and any desired mixtures of these polymers. A particularly preferred matrix material is a polyepoxide. It has been found that, surprisingly, using the coating composition of the invention in or as size formulation, a composite material having a polyepoxide as matrix material is obtained, having comparable properties to, preferably better properties than, an epoxide-based size composition. Without wishing to be bound to a theory, it is assumed that the free —COOH groups of the polyurethaneurea dispersion of the invention react with, i.e. open, the epoxy rings of the matrix material, and hence covalent bonds are formed between the size and the matrix material. This leads to excellent mechanical properties, especially transverse tensile strengths, of the composite material.

More preferably, the composite material of the invention includes 20% to 90% by weight, especially preferably 30% to 80% by weight, of the fibres, based on the total weight of the fibres and the matrix material.

EXAMPLES

Raw Materials:

Polyester 170 HN (170 HN): polyester polyol formed from adipic acid, hexane-1,6-diol and neopentyl glycol, having a molar mass of 1700 g/mol (BAYER AG, Leverkusen)

Polyester PEI 200 H (PEI 200 H): polyester formed from adipic acid, isophthalic acid and hexane-1,6-diol, having a molar mass of 2000 g/mol (BAYER AG, Leverkusen)

LB 25: Monohydroxy-functional polyether formed from ethylene oxide and propylene oxide, having a proportion by weight of 84% ethylene oxide and a molar mass of 2250 g/mol (BAYER AG, Leverkusen)

Desmodur I (IDPI): isophorone diisocyanate (BAYER AG, Leverkusen)

Desmodur H (HDI): hexamethylene diisocyanate (BAYER AG, Leverkusen)

DMPA: dimethylolpropionic acid (DMPA, ALDRICH, DE)

6-aminohexanoic acid (AHA, ALDRICH, DE)

diethanolamine (DEA, ALDRICH DE)

isophoronediamine (IPDA, ALDRICH DE)

carbohydrazide (CH, ALDRICH DE)

Methods:

The viscosity was determined using a Haake viscometer at room temperature (23° C.) with a shear rate of 45 s−1.

The solids contents (SCs) were determined to DIN EN ISO 3251.

The median particle sizes (MTG) were determined by means of static light scattering Instruments, model: Zetasizer 1000). The reported values are the D50 of the Z average.

The NCO content is determined by volumetric means in accordance with DIN-ISO 11909.

Production of the Glass Fibres:

The glass fibres were produced in a laboratory spinning system from the Leibniz Institute of Polymer Research (Dresden). This was done by sizing the E glass fibres having a diameter of 17 μm and a fineness of 120 tex by means of a roll applicator directly after exit from the melt die, with variation of the film former in the size formulation. The glass fibre rovings were then dried at 130° C. for 5 h.

Production of the Unidirectional Composite Specimens:

The corresponding fibre rovings were used to produce unidirectional glass fibre-epoxy composites by infiltrating the previously wound glass fibres with a two-component epoxy resin at 80° C. and then hardening at 90° C. for 8 h. The injection resin used was a mixture of Epikote RIM 145 and Epikure RIMH 145, catalysed by RIMC145; the mixing ratio was 100/82/0.5.

Determination of Transverse Tensile Strengths:

The transverse tensile strength of the composite specimen was determined in accordance with ISO 527 with a pulling speed of 1 mm/min.

Preparation of the Dispersions

Ex. 1 (Counter-Example)

291.0 g of the polyester PE 170 HN are initially charged in a reaction vessel together with 44.5 g of LB 25 and heated up to 75° C. while stirring. Subsequently, a mixture of 32.3 g of IPDI with 24.4 g of HDI is added within a few minutes, in the course of which the reaction temperature is increased to 115° C. On attainment of the desired NCO value (2.17% by weight; theory: 2.35% by weight), the prepolymer formed is dissolved in 697 g of acetone at 40° C. Thereafter, a mixture of 9.1 g of DEA with 11.3 g of IPDA in 214.5 g of water is added within 2 min and stirring is continued for a further 15 min. Dispersion is effected within 30 min by adding 517 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 2 (Inventive)

280.0 g of the polyester PE 170 HN are initially charged in a reaction vessel together with 44.5 g of LB 25 and 11.7 g of DMPA and heated up to 75° C. while stirring. Subsequently, a mixture of 47.6 g of IPDI with 36.0 g of HDI is added within a few minutes, in the course of which the reaction temperature is increased to 115° C. On attainment of the desired NCO value (2.72% by weight; theory: 3.08% by weight), the prepolymer formed is dissolved in 784 g of acetone at 40° C. Thereafter, a mixture of 22.2 g of DEA with 9.5 g of IPDA in 158.6 g of water is added with 2 min and stirring is continued for a further 15 min. Dispersion is effected within 30 min by adding 550 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 3 (Inventive)

218.0 g of the polyester PE 170 HN are initially charged in a reaction vessel together with 65.5 g of LB 25 and 16.6 g of DMPA and heated up to 75° C. while stirring. Subsequently, a mixture of 47.6 g of IPDI with 36.0 g of HDI is added within a few minutes, in the course of which the reaction temperature is increased to 115° C. On attainment of the desired NCO value (3.34% by weight; theory: 3.53% by weight), the prepolymer formed is dissolved in 683 g of acetone at 40° C. Thereafter, a mixture of 22.2 g of DEA with 9.5 g of IPDA in 158.6 g of water is added with 2 min and stirring is continued for a further 15 min. Dispersion is effected within 30 mm by adding 465 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 4 (Counter-Example)

597.7 g of the polyester PEI 200 H are initially charged in a reaction vessel together with 112.3 g of LB 25 and 20.1 g of DMPA and heated up to 75° C. while stirring. Subsequently, a mixture of 81.5 g of IPDI with 61.7 g of HDI is added within a few minutes, in the course of which the reaction temperature is increased to 115° C. On attainment of the desired NCO value (2.42% by weight; theory: 2.66% by weight), the prepolymer formed is dissolved in 1553 g of acetone at 40° C. Thereafter, a mixture of 22.9 g of DEA with 28.6 g of IPDA in 257.4 g of water is added with 2 min and stirring is continued for a further 15 min. Dispersion is effected within 30 mm by adding 465 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 5 (Counter-Example)

667 g of the polyester PEI 200 H are initially charged in a reaction vessel together with 81.9 g of LB 25 and heated up to 75° C. while stirring. Subsequently, a mixture of 59.4 g of IPDI with 45.0 g of HDI is added within a few minutes, in the course of which the reaction temperature is increased to 115° C. On attainment of the desired NCO value (1.84% by weight; theory: 1.99% by weight), the prepolymer formed is dissolved in 1518 g of acetone at 40° C. Thereafter, a mixture of 27.7 g of DEA with 11.9 g of IPDA in 198.2 g of water is added with 2 min and stirring is continued for a further 15 min. Dispersion is effected within 30 min by adding 1142 g of demineralized water while stirring constantly. The remaining acetone is distilled off at 45° C. and a pressure of 120 mbar, giving rise to a solvent-free polyurethane dispersion having the characteristic data listed in Tab. 1.

Example 6 (Inventive)

667.3 g of the polyester PEI 200 H are initially charged in a reaction vessel together with 81.9 g of LB 25 and heated up to 75° C. while stirring. Subsequently, a mixture of 59.4 g of IPDI with 45.0 g of HDI is added within a few minutes, in the course of which the reaction temperature is increased to 115° C. On attainment of the desired NCO value (1.95% by weight; theory: 1.99% by weight), the prepolymer formed is dissolved in 1516 g of acetone at 40° C. Thereafter, a mixture of 34.6 g of AHA with 11.9 g of IPDA in 232.6 g of water is added with 2 mm and stirring is continued for a further 15 min. Dispersion is effected within 30 min by adding 1118 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 7 (Inventive)

191.3 g of the polyester PE 170 HN are initially charged in a reaction vessel together with 39.2 g of LB 25 and 34.9 g of DMPA and heated up to 75° C. while stirring. Subsequently, a mixture of 67.9 g of IPDI with 51.4 g of HDI is added within a few minutes, in the course of which the reaction temperature is increased to 115° C. On attainment of the desired NCO value (4.10% by weight; theory: 5.04% by weight), the prepolymer formed is dissolved in 684 g of acetone at 40° C. Thereafter, 48.5 g of DEA in 48.5 g of water are added with 2 min and stirring is continued for a further 15 min. Dispersion is effected within 30 min by adding 601 g of demineralized water while stirring constantly. The remaining acetone is distilled off at 45° C. and a pressure of 120 mbar, giving rise to a solvent-free polyurethane dispersion having the characteristic data listed in Tab. 1.

Ex. 8 (Counter-Example)

304 g of the polyester PE 170 HN are initially charged in a reaction vessel together with 18.2 g of LB 25 and heated up to 75° C. while stirring. Subsequently, 91.0 g of IPDI are added within a few minutes, in the course of which the reaction temperature is increased to 115° C. On attainment of the desired NCO value (4.29% by weight; theory: 4.61% by weight), the prepolymer formed is dissolved in 687 g of acetone at 40° C. Thereafter, a mixture of 54.0 g of CH (as a 10% aqueous solution) with 26.5 g of IPDA is added with 2 min and stirring is continued for a further 15 min. Dispersion is effected within 30 min by adding 582 g of demineralized water while stirring constantly. The remaining acetone is distilled off at 45° C. and a pressure of 120 mbar, giving rise to a solvent-free polyurethane dispersion having the characteristic data listed in Tab. 1.

TABLE 1

Characteristic data for the example dispersions; in all example dispersions, 0% of the —COOH groups have been neutralized

| Ex. | Chain termination level % | Proportion of COOH/ % by wt. | SC/ % by wt. | pH | Viscosity/ mPas | MTG/ nm |
|---|---|---|---|---|---|---|
| 1* | 18 | 0 | 42.9 | 6.6 | 320 | 110 |
| 2 | 28 | 0.83 | 41.4 | 5.4 | 215 | 115 |
| 3 | 28 | 1.34 | 42.7 | 5.3 | 430 | 80 |
| 4* | 18 | 0.73 | 39.2 | 5.3 | 140 | 85 |
| 5* | 28 | 0 | 43.4 | 8.7 | 165 | 330 |
| 6 | 28 | 1.31 | 40.9 | 5.4 | 35 | 165 |
| 7 | 39 | 2.48 | 41.1 | 3.8 | 35 | 300 |
| 8* | 1 | 0 | 42.5 | 5.9 | 20 | 280 |

*Counter-examples

Production of the Glass Fibre Sizes

For production of the glass fibre sizes, the illustrative dispersions and a commercially available aqueous epoxy dispersion are initially charged in dilute form and a mixture of silane adhesion promoters is added while stirring. This is followed by the addition of a cationic surfactant. The sizes each have a solids content of 3.6%-3.7%, the solids consisting of in each case about 2.7% of the illustrative dispersion, in each case 0.5% by weight of a 1:1 mixture of aminopropyltriethoxysilane and glycidyloxypropyltriethoxysilane, and in each case 0.4% of a cationic surfactant (Katax 6760 L type). The resulting size has a pH of 5.0-6.0 and a surface tension of 30-32 mN/m. No sedimentation at all is observed within 24 h.

Mechanical Properties of the Composite Specimens

The test specimens produced by infiltration of the wound UD boards are characterized mechanically with regard to the transverse tensile strength; the data ascertained can be found in Tab. 2.

TABLE 2

Transverse tensile strength of the composite specimens

| Ex. | Chain termination level/ mol % | Proportion of COOH/ % by wt. | Transverse tensile strength/ MPa |
|---|---|---|---|
| 1* | 18 | 0 | 37 ± 2 |
| 2 | 28 | 0.83 | 49 ± 2 |
| 3 | 28 | 1.34 | 56 ± 3 |
| 4* | 18 | 0.73 | 40 ± 3 |
| 5* | 28 | 0.73 | 40 ± 2 |
| 6 | 28 | 1.31 | 56 ± 2 |
| 7 | 39 | 2.48 | 77 ± 2 |
| 8* | 1 | 0 | 36 ± 2 |
| 9** | X | X | 71 ± 5 |

*Counter-examples
**Fibre size based on epoxy emulsion

It is apparent that some of the dispersions of the invention lead to transverse tensile strengths similar to the level for a standard epoxy emulsion. It is likewise clearly apparent that the specific combination of chain termination level and the content of —COOH groups leads to improvement in transverse tensile strengths. It is particularly advantageous when a relatively high chain termination level is used together with a relatively high content of —COOH groups (see Example 7).

The invention claimed is:

1. An aqueous polyurethaneurea dispersion, the polyurethaneurea comprising at least the following components as formation components:
   A) at least one polyisocyanate compound having a functionality of ≤2,
   B) at least one polyol,
   C) at least one formation component which differs from components B), D) and, if present, component E) and which has at least one group reactive toward isocyanate groups and at least one —COOH group, and
   D) at least one nonionic hydrophilizing agent having at least one group reactive toward isocyanate groups, and
   E) optionally at least one monofunctional compound reactive toward isocyanate groups which is different from C) and D) and does not have any unsaturated groups or epoxy groups,
   wherein
   the polyurethaneurea has a content of —COOH groups of 0.75% to 7.50% by weight in relation to the total weight of the polyurethaneurea in the dried state and 0% to 10% of these —COOH groups have been neutralized, and
   wherein 5 to 50 mol % of the isocyanate groups of component A) have been reacted with a monofunctional component selected from the group consisting of one of components C), D), E), and the sum total of a mixture of components C), D) and E), and
   wherein, when neither component C) nor component D) is monofunctional, component E) is necessarily present as formation component.

2. The aqueous polyurethaneurea dispersion according to claim 1, wherein 20 to 48 mol % of the isocyanate groups of component A) have been reacted with a monofunctional component selected from the group consisting of one of components C), D), E), and the sum total of a mixture of components C), D) and E), and wherein, when neither component C) nor component D) is monofunctional, component E) is necessarily present as formation component.

3. The aqueous polyurethaneurea dispersion according to claim 1, wherein the polyurethaneurea has a content of —COOH groups of 1.00% to 5.00% by weight in relation to the total weight of the polyurethaneurea in the dried state.

4. The aqueous polyurethaneurea dispersion according to claim 1, wherein component C) is selected from the group consisting of monohydroxycarboxylic acids, dihydroxycarboxylic acids, dihydroxydicarboxylic acids, trihydroxycarboxylic acids, monoaminocarboxylic acids, diaminocarboxylic acids, triaminocarboxylic acids, and mixtures thereof.

5. The aqueous polyurethaneurea dispersion according to claim 1, wherein component D) is a monofunctional polyethylene glycol-containing component wherein the proportion of polyethylene glycol is at least 50% by weight and which has a molar mass Mn 1200 g/mol to 3000 g/mol.

6. The aqueous polyurethaneurea dispersion according to claim 1, wherein component B) is at least one aliphatic polyester polyol.

7. A method for preparing a coating composition comprising utilizing the aqueous polyurethaneurea dispersion according to claim 1.

8. The method of claim 7, wherein the coating composition is a glass fibre size.

9. An aqueous coating composition comprising at least one aqueous polyurethaneurea dispersion according to claim 1 and at least one of auxiliary and/or additive.

10. A process for producing a coated fibre comprising
   (i) providing at least one fibre;
   (ii) applying the aqueous coating composition according to claim 9 to at least a portion of a surface of the at least one fibre from (i), forming an at least partly coated fibre, and
   (iii) curing the coating of the at least partly coated fibre from (ii).

* * * * *